United States Patent [19]

Matsuoka et al.

[11] 4,250,710
[45] Feb. 17, 1981

[54] EXHAUST GAS RELIEF VALVE DEVICE

[75] Inventors: Hideaki Matsuoka, Zama; Nobuhiro Kondo, Matsudo, both of Japan

[73] Assignee: Ishikawajima-Harima Jukogyo Kabushiki Kaisha, Tokyo, Japan

[21] Appl. No.: 919,441

[22] Filed: Jun. 26, 1978

[30] Foreign Application Priority Data

Sep. 3, 1977 [JP] Japan ............... 52-118757[U]

[51] Int. Cl.³ ............................................. F02B 37/00
[52] U.S. Cl. ............................................. 60/602
[58] Field of Search ............... 60/600, 601, 602, 603; 123/41.41, 41.77, 41.85, 188 GC

[56] References Cited

U.S. PATENT DOCUMENTS

| | | | |
|---|---|---|---|
| 2,063,779 | 12/1936 | Baj | 123/41.77 X |
| 2,967,518 | 1/1961 | Zuhn | 123/41.85 X |
| 4,075,849 | 2/1978 | Richardson | 60/602 |

FOREIGN PATENT DOCUMENTS

| | | | |
|---|---|---|---|
| 2657794 | 6/1978 | Fed. Rep. of Germany | 60/602 |
| 722329 | 12/1931 | France | 123/41.85 |

*Primary Examiner*—Michael Koczo
*Attorney, Agent, or Firm*—Scrivener, Clarke, Scrivener and Johnson

[57] ABSTRACT

In an apparatus wherein part of the compressed air from the compressor of a turbocharger is used as control air and is made to act on a diaphragm so as to control an exhaust gas relief valve, thereby controlling the amount of exhaust gas to be charged into the turbine of a turbocharger. The present invention discharges into the exhaust gas the control air which acts on the diaphragm.

1 Claim, 2 Drawing Figures

EXHAUST GAS RELIEF VALVE DEVICE

DETAILED DESCRIPTION OF THE INVENTION

The present invention relates to an exhaust gas relief valve device and more particularly an exhaust gas relief valve device which, in order to control the discharge air pressure of the compressor of a turbocharger utilizing the exhaust gas energy of an internal combustion engine below a predetermined value, controls the amount of exhaust gas to enter into the turbine of the turbocharger by controlling the exhaust gas relief valve by utilizing a part of the compressed air from the compressor of the turbocharger and having it act on a diaphragm. In the conventional valve devices of this type even though the control air is at a low temperature of the order of about 50° C., it simply acts on the diaphragm and no flowing means is provided so that it has no function for cooling the exhaust gas relief valve. The exhaust gas temperature is very high reaching about 750° C. in case of a diesel engine and about 1000° C. in case of a gasoline engine so that the heat which the exhaust gas has is transmitted from the relief valve to the diaphragm and from the diaphragm to a spring and the spring characteristics change whereby the reliable operation cannot be expected. Therefore attempts have been made to provide cooling fins on a main body of the relief valve device so as to air cool, but in order to attain satisfactory cooling effect the surface areas of the cooling fins must be remarkably increased so that there is a defect that the increase in size inevitably results. Moreover carbides contained in the exhaust gas can not be prevented from intruding into moving part clearances of the relief valve.

The present invention has for its object to prevent the carbides contained in the exhaust gas from intruding into the moving part clearances of the relief valve by using the control air as the cooling air so as to directly cool the diaphragm and the relief valve and indirectly cooling the spring and further forming low temperature air curtains when flowing into the exhaust gas.

Figure 1:
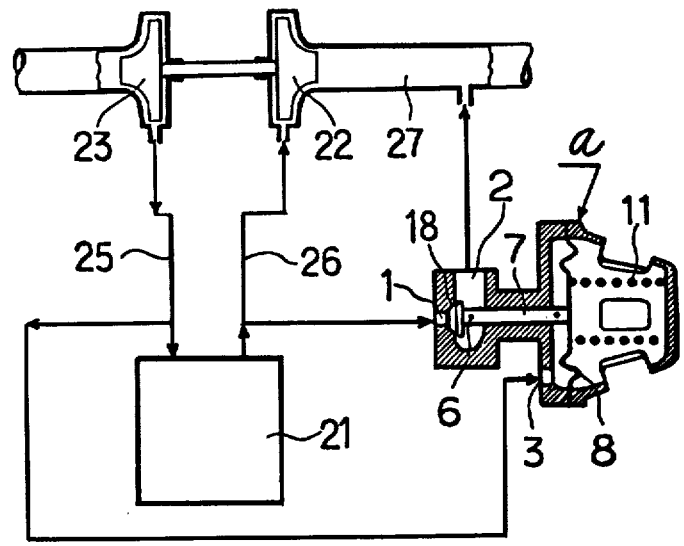
Figure 2:
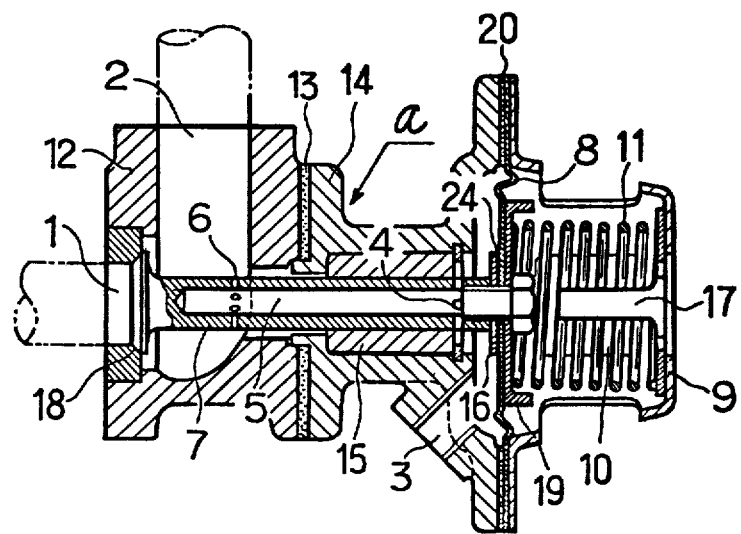

The device of the present invention will be described below with reference to the accompanying drawings, in which:

FIG. 1 is a schematic view, partly in section, of a device in operation in accordance with the present invention; and FIG. 2 is a cross sectional side view of the device of the present invention.

In FIG. 1 is one embodiment of an exhaust gas relief valve device in accordance with the present invention and will be described in detail hereinafter. It has an exhaust gas inlet port 1, an exhaust gas outlet port 2, and a boost pressure inlet port 3 and further an exhaust gas relief valve 7 and a diaphragm 8 and a spring 11. And the exhaust gas discharged from an internal combustion engine 21 enters a turbocharger through an exhaust pipe 26, turning a turbine 22. Then, this turbine 22 and an air compressor 23 which is fixed coaxially of the turbine 22 rotate to supply the compressed air through a suction pipe 28 to the internal combustion engine 21. Here, the exhaust gas inlet port 1 of the exhaust gas relief valve device a is connected to the exhaust pipe 26, the exhaust gas outlet port 2 is connected to a turbocharger gas outlet pipe 27 and the boost pressure inlet port 3 is connected to the intake manifold or air delivery pipe 25 so that when the air pressure discharged from the compressor 23 exceeds a pressure determined by the diaphragm 8 and the spring 11, the diaphragm 8 moves to the right in FIG. 1 against the spring 11 and the exhaust gas relief valve 7 fixed to the diaphragm 8 moves in the same direction. Then, a seat portion 18 is opened by the movement of this valve 7 and part of the exhaust gas discharged from the internal combustion engine 21 flows through the exhaust gas relief valve device a into a turbocharger gas outlet pipe 27, thereby decreasing the amount of the exhaust gas flowing into the turbine 22 from the internal combustion engine 21, reducing the rotational speed of the turbine 22 and maintaining the air pressure discharged from the compressor 23 below a predetermined level.

Next referring to FIG. 2, the exhaust gas relief valve device a will be described in detail hereinafter. A main body 12 has the exhaust gas inlet port 1, the exhaust gas outlet port 2 and a seat surface corresponding to the valve seat portion 18. A main body cover 14 has the boost pressure inlet port 3 and has a bushing 15 supporting the exhaust gas relief valve 7 and is fixed to the main body 12. The valve 7, and the seat portion 18 form a seat surface between the main body 12 supported by the bushing 15, and a plate member 16 and a spring support 19 is fixed to the diaphragm 8. A spring holder 9 holds down the spring 11 with a stopper 17 and clamps even the diaphragm 8 and is fixed to the main body cover 14. A thermal insulator 13 is disposed between the main body 12 and the main body cover 14, a thermal insulator 20 is disposed between the main body 14 and the diaphragm 8, and a thermal insulator 24 is disposed between the plate member 16 and the diaphragm 8, whereby the heat transmission to the diaphragm 8 and to the spring 11 may be reduced. Furthermore, the spring holder 9 is formed with holes 10 so that the diaphragm 8 and the spring 11 may be cooled by the exterior air. The exhaust gas relief valve 7 has pores 4 which are located on the side of the diaphragm 8 and are radially directed, pores 6 which are located on the side of the exhaust gas outlet port 2 and are radially directed, and bore 5 which is disposed in the interior and directed in the longitudinal direction. Therefore the pores 4 and 6 and bore 5 constitute an air passage for flowing the control air into the exhaust gas after acting upon the diaphragm 8.

In the exhaust gas relief valve device a constructed as described above, when the air pressure which is introduced through the boost pressure inlet port 3 rises and $$\frac{\text{(load on spring 11)}}{\text{(area of diaphragm 8)} \times \text{(air pressure)}}$$

is less than 1, the diaphragm 8 moves to the right in FIG. 2 against the spring 11 and the exhaust gas relief valve 7 which is integral with the diaphragm 8 moves to the right and the valve seat portion 18 arranged between the valve 7 and the main body 12 is opened and the exhaust gas flows from the inlet port 1 to the outlet port 2 as described above. Now the low temperature air of about 50° C. which is introduced from the boost pressure inlet port 3 not only acts on the diaphragm 8 with its pressure but also flows through the pores 4, bore 5, and pores 6 formed in the exhaust gas relief valve 7 to the exhaust gas outlet port 2, preventing any temperature rise, decreasing the air temperature in contact with the diaphragm 8, cooling the diaphragm 8 and furthermore cooling the valve 7 and decreasing the heat transmission from the valve 7 to the diaphragm 8. The air flowing out from the pores 6 of the valve 7 forms a kind of low temperature air curtain around the valve 7, preventing the heat transmission to the valve 7 and to the main body 12 due to the high temperature gas at the exhaust gas outlet port 2 and the intrusion of the carbides contained in the exhaust gas into the moving part clearances between the valve 7 and the bushing 15.

In the embodiment shown in FIG. 2, the pores 4 and 6, and bore 5 have been described as the air passage for flowing into the exhaust gas the control air after it has acted on the diaphragm 8, but the pore 6 may be eliminated and the bore 5 may be extended to the left in FIG. 2 and communicated with the exhaust gas inlet port 1. Moreover, instead of the pores 4 and 6, and bore 5, a large number of grooves may be formed in the outer surface of the exhaust gas relief valve 7 in the longitudinal direction and communicated with the exhaust gas outlet port 2. Or a large number of similar grooves are formed in the longitudinal direction in the interior surface of the valve supporting bushing 15 as if splines. Or these may be combined.

Because of the construction of the device of the present invention, the following excellent effects may be obtained;

(i) The flows may be formed in such a way that the air in contact with the diaphragm may be always maintained at low temperature, extreme high temperature rise of the diaphragm and spring may be prevented and the operation may be stabilized.

(ii) The control air which is inevitably required is so utilized that the low temperature air is made to flow to the exhaust gas relief valve which has great influence on the thermal transmission to the diaphragm and spring, thereby lowering the temperature of the valve and preventing the temperature rise of each part, whereby the whole device may be made compact in size.

(iii) The control air is made to flow through the air passage along the exhaust gas relief valve into the exhaust gas so that when the control air flows into the exhaust gas, the low temperature air curtain is constructed with clean air and the intrusion of the carbides or the like contained in the exhaust gas into the moving part clearances between the exhaust gas relief valve and bushing as well as stickiness of the valve may be prevented.

What is claimed is:

1. In a turbocharger system including an engine (21) having a cool compressed gas inlet (25) and a hot exhaust gas outlet (26); a turbine (22) having an inlet connected with the engine hot gas outlet, said turbine also including an outlet; a compressor (23) driven by the turbine, said compressor having an outlet connected with the engine inlet; and exhaust gas relief valve means including (a) a housing (12,14) containing a valve chamber and including an outlet port (2) and a first inlet port (1) each communicating with said chamber, said outlet port being connected with said turbine outlet, and said first inlet port being connected with said engine hot gas outlet, a wall portion of said housing containing a through opening;

(b) valve means normally closing said inlet opening, said valve means including
  (1) a valve member (7) having a stem portion slidably mounted for axial displacement in said through opening, said valve member carrying at the end thereof within said chamber a valve head portion; and
  (2) spring means (11) biasing said valve member in one direction toward a closed position in which said valve head portion is seated in closed relation on said first inlet port; and (c) means for displacing said valve member in the opposite direction against the biasing force of said spring means toward an open position relative to said first inlet opening, including
  (1) means including a diaphragm (8) defining a diaphragm chamber opposite said through opening, said diaphragm being connected with the other end of said valve member; and
  (2) means including a second input port (3) connected with said compressor outlet for supplying relatively cool pressure fluid to said diaphragm chamber to displace said valve member toward the open position; the improvement which comprises (d) means affording continuous communication between said second inlet port and said outlet port when said valve member is in either of its closed and open positions, comprising
  (1) means defining a longitudinal passage (5) in said valve stem portion;
  (2) at least one stem inlet opening (4) contained in said valve stem portion affording communication between said diaphragm chamber and said valve stem passage; and
  (3) a plurality of radially arranged stem outlet openings (6) contained in said valve stem portion adjacent said through opening affording communication between said valve stem passage and said valve chamber, whereby the cool compressor output gases are conveyed in cooling relation from said diaphragm chamber to said valve chamber via said valve stem passage and via said radially arranged stem outlet openings, thereby to establish a low temperature fluid curtain adjacent said through opening.

* * * * *